United States Patent
Jung

(10) Patent No.: US 8,081,140 B2
(45) Date of Patent: Dec. 20, 2011

(54) MULTI-SCREEN SYSTEM AND DRIVING METHOD THEREOF

(75) Inventor: Suck Hwa Jung, Gumi-si (KR)

(73) Assignee: LG Electronics Inc., Seoul (KR)

( * ) Notice: Subject to any disclaimer, the term of this patent is extended or adjusted under 35 U.S.C. 154(b) by 958 days.

(21) Appl. No.: 11/192,108

(22) Filed: Jul. 29, 2005

(65) Prior Publication Data

US 2006/0161948 A1  Jul. 20, 2006

(30) Foreign Application Priority Data

Jan. 14, 2005  (KR) .......................... 10-2005-003771

(51) Int. Cl.
*G09G 5/00* (2006.01)

(52) U.S. Cl. ....... 345/1.1; 725/37; 725/135; 348/E5.104

(58) Field of Classification Search ................... 345/1.1, 345/4
See application file for complete search history.

(56) References Cited

U.S. PATENT DOCUMENTS

| | | | | |
|---|---|---|---|---|
| 5,351,129 | A * | 9/1994 | Lai | 348/584 |
| 5,361,078 | A * | 11/1994 | Caine | 345/1.3 |
| 5,742,269 | A * | 4/1998 | Hayashiguchi et al. | 345/87 |
| 5,805,118 | A | 9/1998 | Mishra et al. | 345/1 |
| 6,522,309 | B1 * | 2/2003 | Weber | 345/1.1 |
| 7,262,746 | B2 * | 8/2007 | Lagarrigue et al. | 345/1.3 |
| 2002/0071057 | A1 * | 6/2002 | Kaneda et al. | 348/588 |
| 2004/0027482 | A1 * | 2/2004 | Lee et al. | 348/383 |

FOREIGN PATENT DOCUMENTS

| | | |
|---|---|---|
| CN | 1474596 A | 2/2004 |
| EP | 0 853 428 A2 | 7/1998 |
| EP | 1 343 315 A1 | 9/2003 |
| JP | 06-214534 | 8/1994 |
| JP | 10-283157 | 10/1998 |
| JP | 10-327369 | 12/1998 |
| JP | 11-136595 | 5/1999 |
| JP | 2000-270238 | 9/2000 |
| JP | 2000-324489 | 11/2000 |
| JP | 2001-094901 | 4/2001 |
| JP | 2003319290 | 11/2003 |
| JP | 2003319290 A | * 11/2003 |

OTHER PUBLICATIONS

Chinese Office Action dated Apr. 4, 2008.
European Search Report dated Dec. 7, 2006.
Korean Office Action dated Oct. 18, 2006.

* cited by examiner

*Primary Examiner* — Kevin M Nguyen
*Assistant Examiner* — Kenneth B Lee, Jr.
(74) *Attorney, Agent, or Firm* — KED & Associates LLP

(57) ABSTRACT

A multi-screen system including an image source device for adding control information about to-be-displayed image segments to a video signal, and a plurality of display devices for detecting the control information from the video signal, extracting image segments corresponding to an ID of a display device from the video signal based on the control information, and displaying the extracted image segments.

39 Claims, 14 Drawing Sheets

FIG. 16

| Address or ID | Command | Data |
|---|---|---|
| # 1 | 1/4 | |
| # 2 | 2/4 | |
| # 3 | 3/4 | |
| #4 | 4/4 | |

US 8,081,140 B2

MULTI-SCREEN SYSTEM AND DRIVING METHOD THEREOF

This application claims the benefit of the Korean Application No. 10-2005-003771 filed on Jan. 14, 2005, which is incorporated by reference in its entirety.

BACKGROUND OF THE INVENTION

1. Field of the Invention

The present invention relates to a multi-screen, and more particularly, to a multi-screen system and method for segmenting an image based on an allocated ID (identification) and a driving method thereof.

2. Discussion of the Related Art

A multi-screen system displays various images on a plurality of monitors and also displays image segments on a plurality of monitors to produce an enlarged image. Such a multi-screen system can be commonly seen in a stock exchange, a racecourse, a karaoke room, or places or events that require multi-screen system.

FIG. 1 is a block diagram of a related art multi-screen system. As shown, the related multi-screen system includes an image source 11, such as a TV or a PC, and a distributor 12 for segmenting an image provided from the image source 11 into a predetermined number and for distributing the segmented image segments to a plurality of monitors 13 via a video line. Accordingly, to provide an image to a newly added monitor, the added monitor must be connected to a set port of the distributor 12 through another video line. In addition, if the arrangement of the monitors 13 is changed, the connection of the monitors 13 and the ports must also be changed.

SUMMARY OF THE INVENTION

Accordingly, one object of the present invention is to address at least the above and other noted problems.

Another object of the present invention is to provide a novel multi-screen system and a driving method thereof, in which an image is segmented according to IDs of a display device or display options.

To achieve these objects and other advantages and in accordance with the purpose of the invention, as embodied and broadly described herein, the present invention provides a novel multi-screen system including an image source device for adding control information about to-be-displayed image segments to a video signal (e.g., R/G/B signal), and a plurality of display devices for detecting the control information from the video signal. Further, the display devices extract image segments corresponding to an ID of the display device from the video signal based on the control information, and display the appropriate extracted image segment.

In addition, the image source device generates the control information based on image segment options inputted or selected by a user. The image segment option includes, e.g., the number of the image segments and positions of the image segments corresponding the ID in an original image. Also, the image source device adds the control information to a section of the video signal corresponding to an uppermost horizontal line of an original image. In addition, the position indicator includes, e.g., a start horizontal line, an end horizontal line, a start vertical line and an end vertical line of the image segment.

The present invention also provides a novel multi-screen system, which includes an image source device for outputting a video signal corresponding to an original image, and a plurality of display devices for extracting image segments from the video signal based on image segment options and for displaying the extracted image segments. The image segment options include at least one of the number and arrangement of the display devices or positions of the image segments to be displayed on the display devices.

The present invention also provides a novel multi-screen system, which includes an image source device for outputting control information about image segments through a data-line and outputting a video signal corresponding to an original image through a video-line. The system also includes a plurality of display devices for receiving the control information and the video signal through the data-line and the video-line, respectively, for extracting image segments corresponding to IDs of the display devices from the video signal, based on the received control information, and displaying the extracted image segments.

Further, the image source device generates the control information based on image segment options inputted or selected by a user. The image segment option includes, e.g., the number of the image segments and positions of the image segments corresponding the ID in an original image. Also, the image source device outputs the IDs to the display devices through the data-line, and outputs one ID to one display device through the data-line and outputs a new ID to another display device if a response signal is received from the one display device. In addition, the image source devices displays the image segments on a screen according to display conditions of the display devices, and/or displays display conditions of the display devices on the screen.

The present invention also provides a novel driving method of a multi-screen system, which includes adding control information relating to about to-be-displayed image segments to a video signal (e.g., an R/G/B signal), transmitting the video signal and the control information to the display devices, detecting the control information from the video signal, and extracting image segments corresponding to an ID of the display devices from the video signal based on the control information. Further, the extracted image segments are also displayed on the display devices.

The present invention further provides a novel driving method of a multi-screen system, which includes setting image segment options to a plurality of display devices, transmitting a video signal corresponding to an original image to the display devices, extracting image segments corresponding to the display device from the video signal based on the set image segment options, and displaying the extracted image segments on the display devices.

Also, the present invention provides a novel driving method of a multi-screen system, which includes generating control information about image segments at an image source device, transmitting the control information from the image source device to a plurality of display devices through a data-line, transmitting the control information from the image source device to the display devices through a video-line, extracting image segments corresponding to IDs assigned to the display devices from the video signal based on the transmitted control information, and displaying the extracted image segments on the display devices.

The present invention also provides a novel display device including a video processor configured to process a video signal, and a controller configured to control the video processor to extract only a portion of the video signal based on input parameters related to the display device.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 16 is a diagram of a control information according to the present invention;

DETAILED DESCRIPTION OF THE PREFERRED EMBODIMENTS

The present invention provides a multi-screen system including an image source device connected to a plurality of display devices through a video line and a data line, which are discussed in more detail below.

First Embodiment

Figure 1:
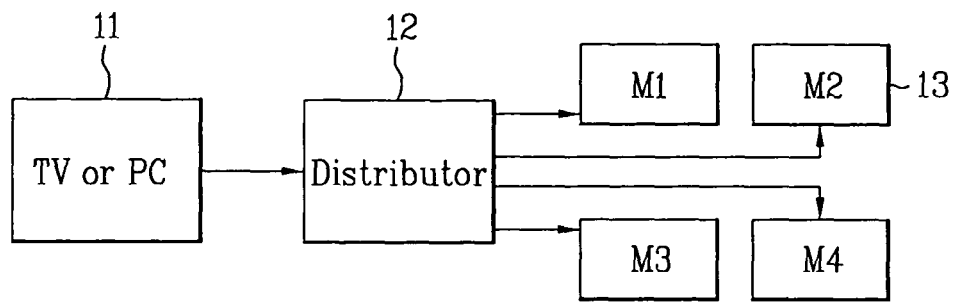
FIG. 1 is a block diagram of a related art multi-screen system.
Figure 2:
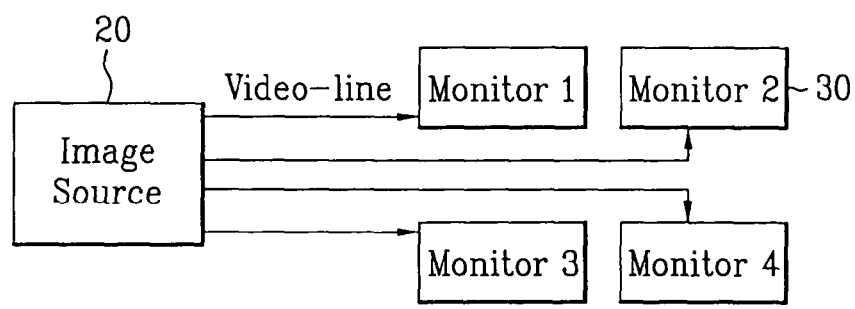
FIGS. 2 and 3 are block diagrams of a multi-screen system according to the present invention.
Figure 3:
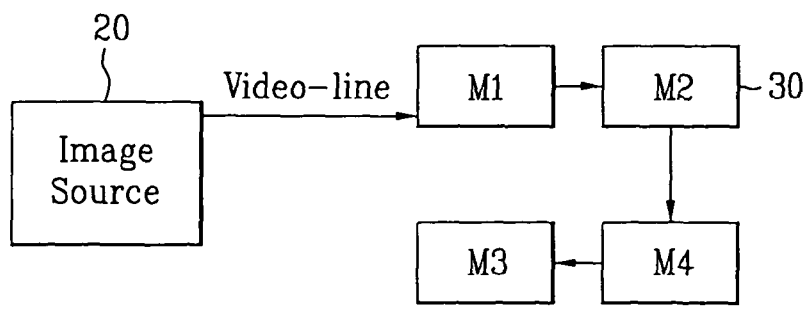

FIGS. 2 and 3 are block diagrams of multi-screen systems according to the present invention. In more detail, FIG. 2 is a block diagram of an image source device 20 directly connected to display devices 30 (e.g., monitors 1-4) through a plurality of video lines, and FIG. 3 is a block diagram of an image source device 20 that transmits image signals to the display devices 30 through a single video line.

Figure 4:
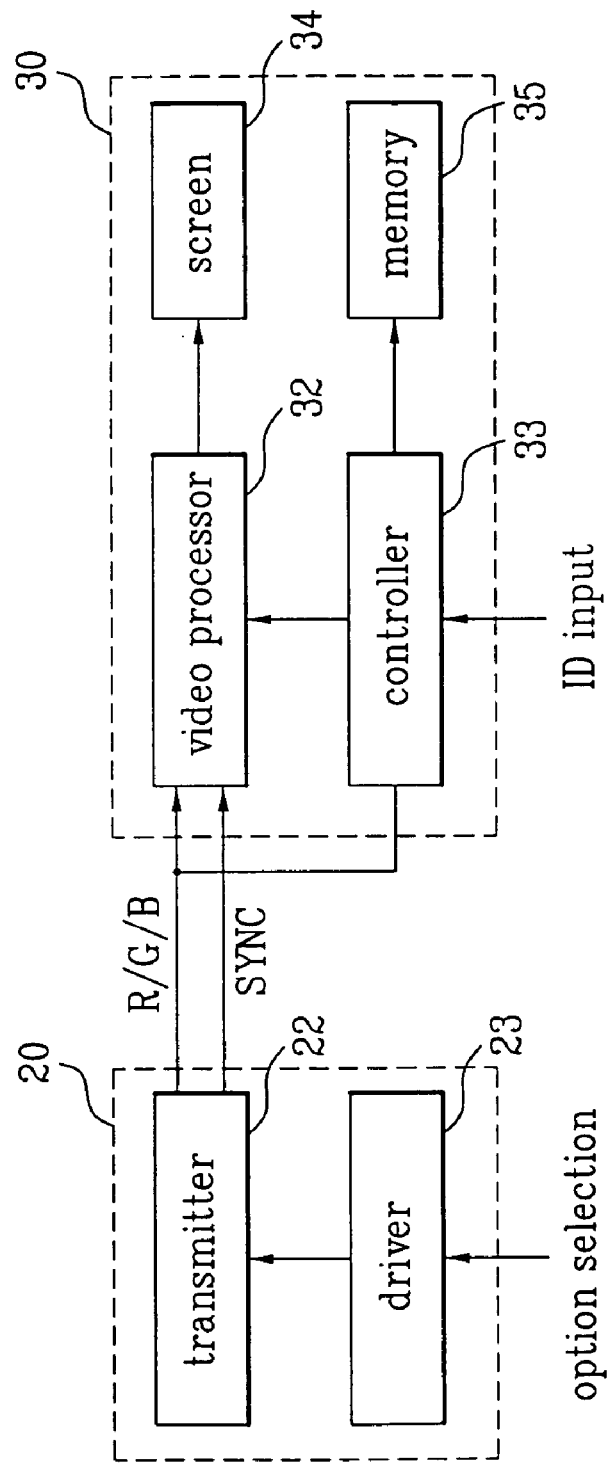
FIG. 4 is a block diagram of a multi-screen system according to a first embodiment of the present invention.

Next, FIG. 4 is a block diagram of the image source 20 and a corresponding display device 30 shown in FIGS. 2 and 3. Further, the image source device 20 is an image providing apparatus, such as a TV, a personal computer (PC), a camcorder, a VCR, a personal video recorder (PVR) and a portable multimedia player (PMP). Referring to FIG. 4, the image source device 20 includes a transmitter 22 and a driver (e.g., a microcomputer) 23. The driver 23 generates information about image segments which will be displayed on the display devices 30 according to a user command.

In addition, the driver 23 receives a video signal (e.g., R/G/B signal) or reads a video signal from a memory (not shown). The driver 23 adds the image segment information to a section of the video signal corresponding to an uppermost horizontal line of an original image to be displayed, and then transmits the image segment information to the transmitter 22. Further, the image segment information includes information that represents positions of the image segments on the original image. The transmitter 22 receives the video signal from the driver 23 and outputs the received video signal and a corresponding horizontal synchronization (H-SYNC) signal and vertical synchronization (V-SYNC) signal.

As shown, the display device 30 includes a video processor 32, a controller 33, a screen 34 and a memory 35. The controller 33 detects the image segment information from the video signal and reads an ID stored in the memory 35. Further, the video processor 32 receives the video signal, the H-SYNC signal and the V-SYNC signal from the image source device 20 and receives the image segment information from the controller 33. Then, the video processor 31 extracts only the image segments corresponding to the stored ID from the received video signal based on the image segment information, and enlarges the extracted image segments and displays it on the screen 34. Thus, using a plurality of display devices 30, each designated segment may be displayed on a separate display, for example.

Figure 5:
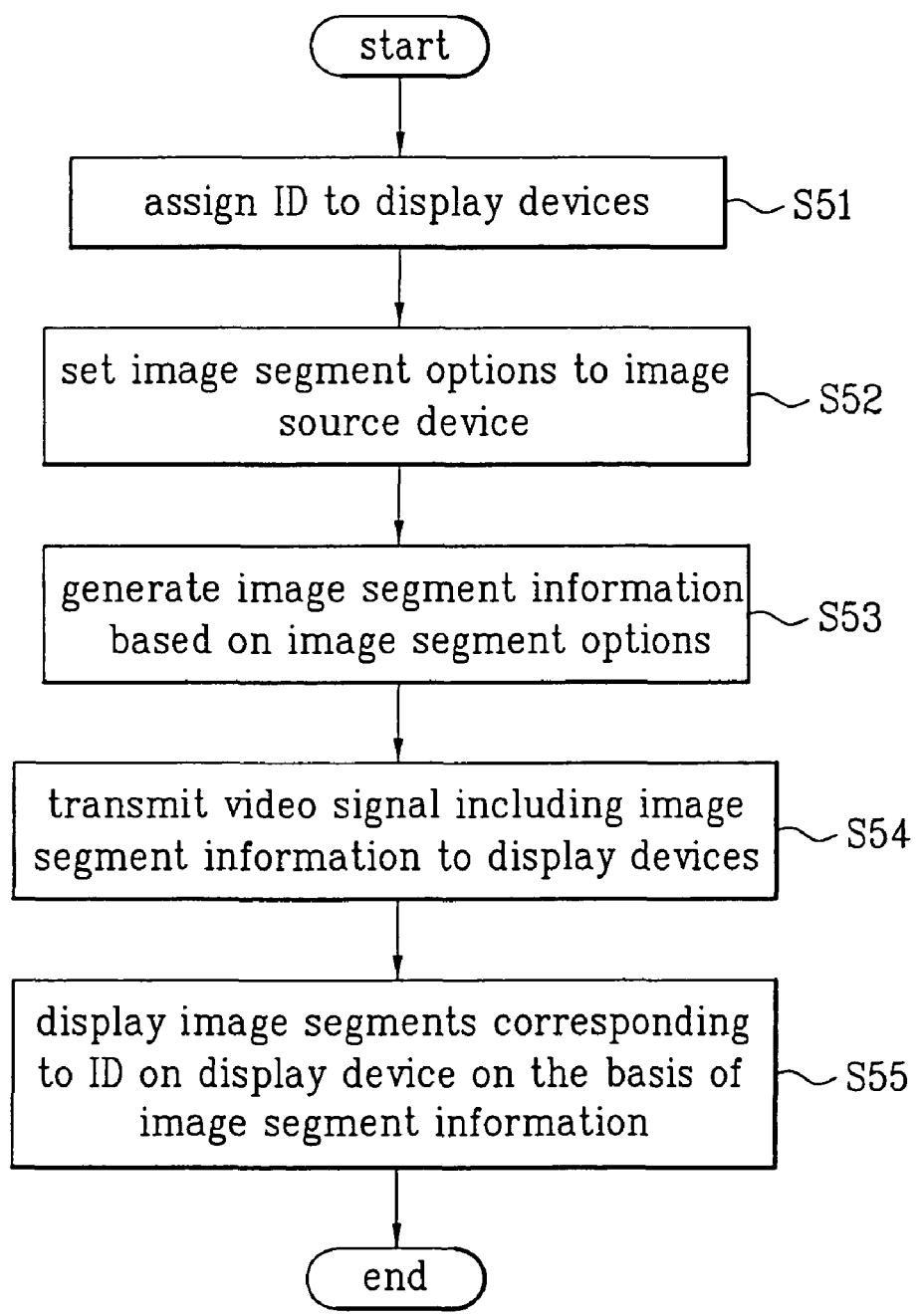
FIG. 5 is a flowchart illustrating a driving method of the multi-screen system according to the first embodiment of the present invention.

A driving method of the multi-screen system according to a first embodiment of the present invention will now be described with reference to FIGS. 4 and 5.

First, a user assigns IDs to the respective display devices 30 through a remote controller or a panel key, for example (S51). The ID inputted to the controller 33 of the display device is stored in the memory 35. Then, the user sets image segment options to the driver 23 (S52). For example, the user inputs or selects the number of the display devices 30, the IDs assigned to the display devices 30, and positions and arrangements of the image segments corresponding to the IDs from an on screen display (OSD) or a selection menu, which is provided With the image source device 20.

Figure 6:
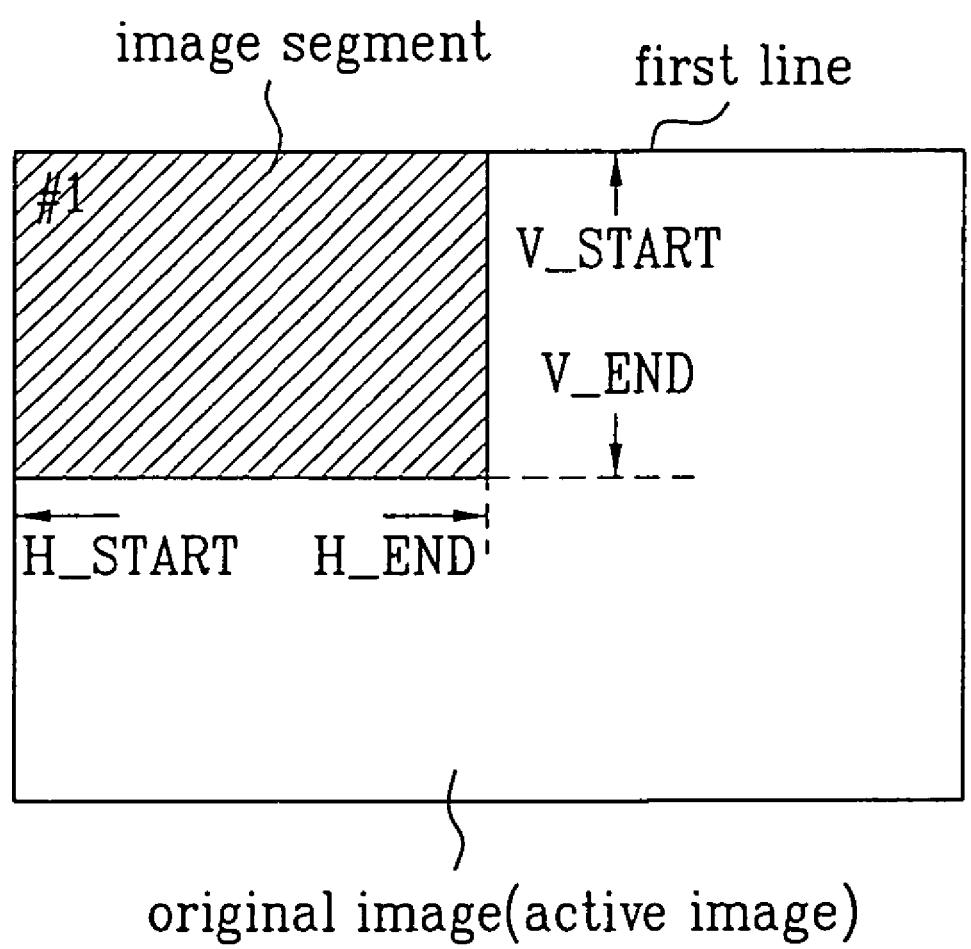
FIG. 6 is a diagram illustrating a position indicator of an image segment.

Further, the driver 23 generates the image segment information based on the image segment options inputted or selected by the user (S53). The image segment information includes, e.g., a position indicator of the image segments corresponding to the IDs. FIG. 6 is a diagram explaining the position indicator. Referring to FIG. 6, the position indicator includes a start horizontal line H_START, an end horizontal line H_END, a start vertical line V_START and an end vertical line V_END of the image segment.

If the image segment information is generated, the driver 23 adds the image segment information to the video signal region corresponding to the uppermost horizontal line of the original image and transmits the video signal containing the image segment information to the transmitter 22. The transmitter 22 then outputs the video signal and the corresponding H-SYNC and V-SYNC signals to the display devices 30 (S54). At this point, as shown in FIG. 2, the transmitter 22 can transmit the video signal and the H-SYNC and V-SYNC signals to the display devices 30 at the same time, or as shown in FIG. 3, the transmitter 22 can transmit the signals through a first display device 30 and then to the other display devices in sequence.

Further, each controller 33 of the display devices 30 receives the video signal from the image source device 20, and the video processor 32 receives the video signal and the H-SYNC and V-SYNC signals. The controller 33 detects the image segment information from the received video signal and checks the position of the image segment corresponding to the assigned ID based on the image segment image information. Further, the controller 33 of each display device 30 controls the video processor 32 to extract only an image segment corresponding to the assigned ID from the received video signal. Then, the video processor 32 extracts the image segments corresponding to the assigned ID from the original image, enlarges the extracted image segment and displays the enlarged image on the screen 34 (S55).

Second Embodiment

Figure 7:
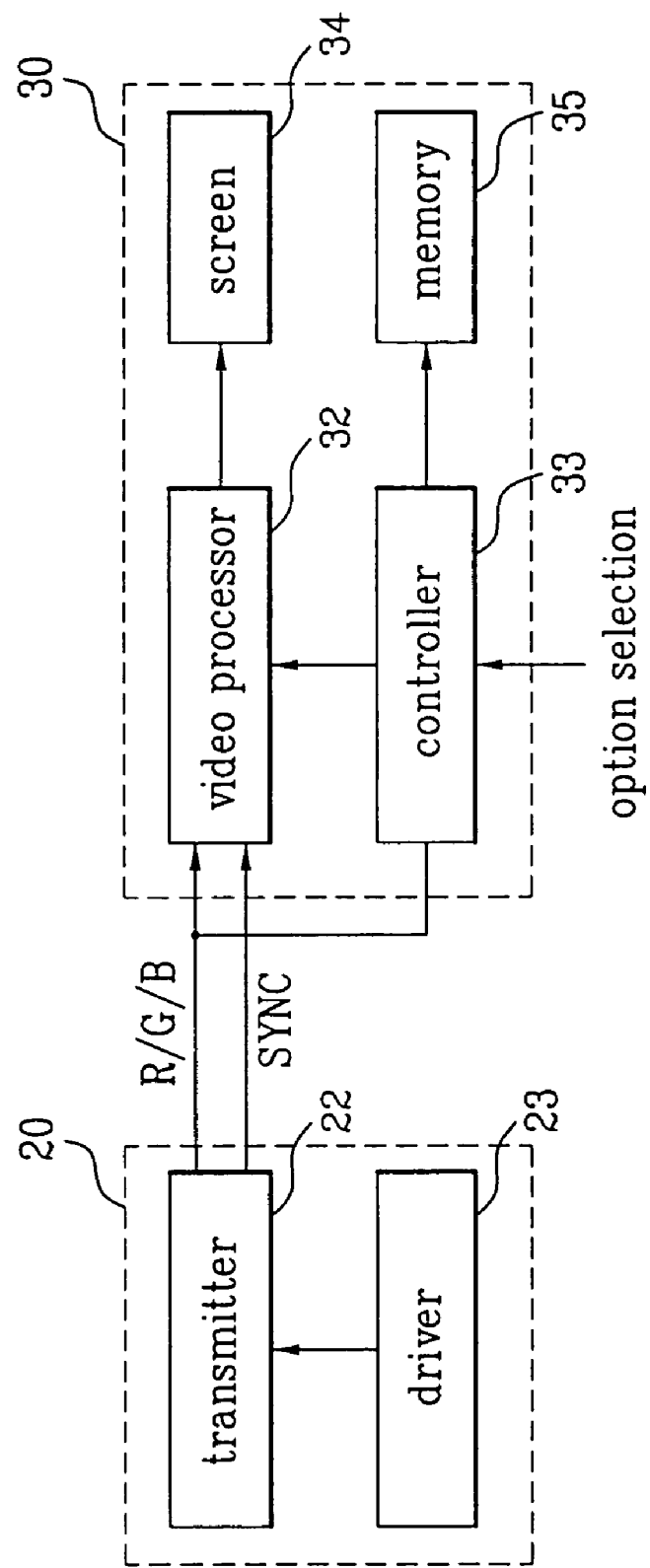
FIG. 7 is a block diagram of a multi-screen system according to a second embodiment of the present invention.
Figure 8:
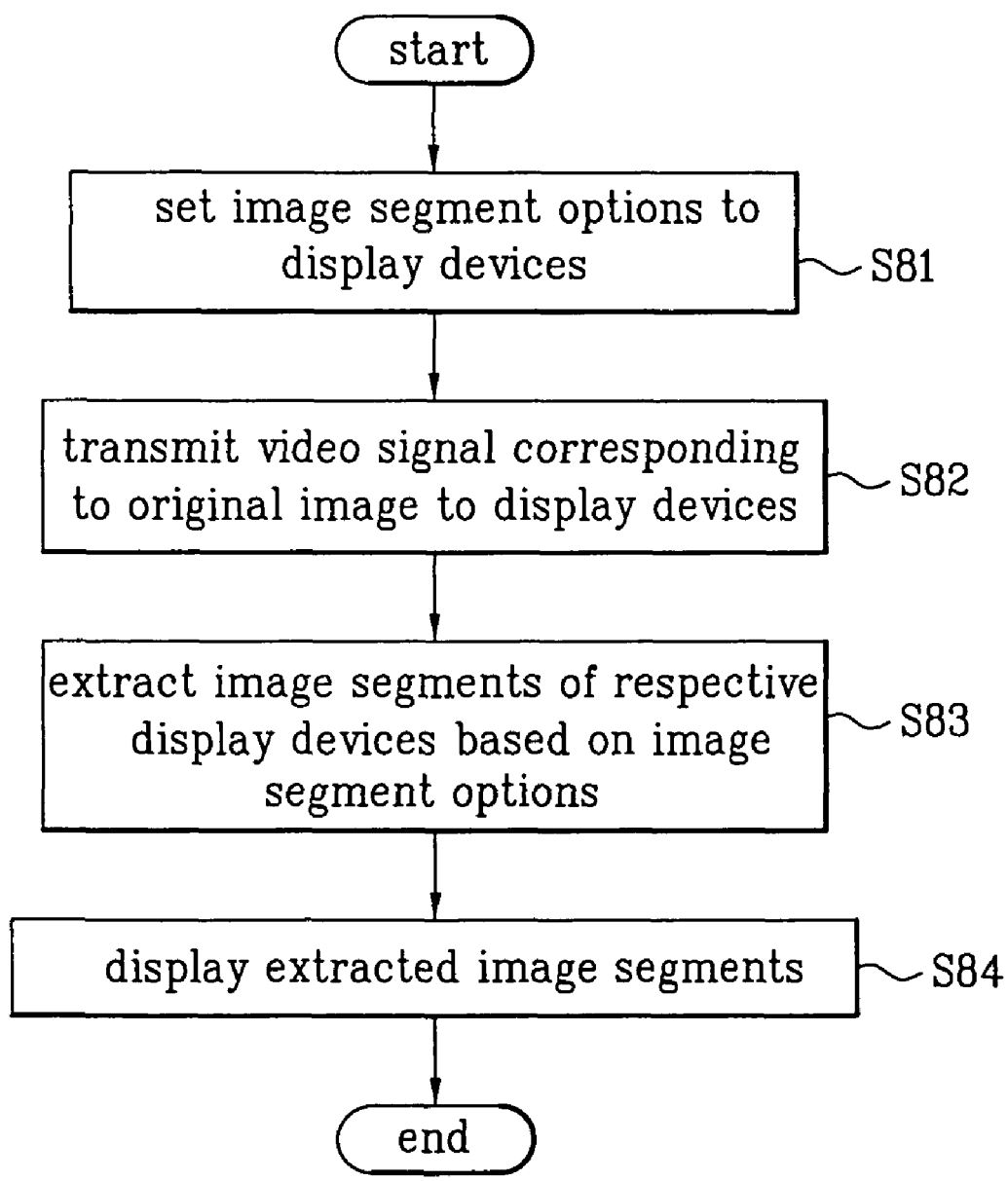
FIG. 8 is a flowchart illustrating a driving method of the multi-screen system according to the second embodiment of the present invention.

FIG. 7 is a block diagram illustrating another example of the image source 20 and a display device 30, and FIG. 8 is a flowchart illustrating a driving method of a multi-screen system according to a second embodiment of the present invention. First, the controller 33 displays an OSD (on screen display) or a Graphical User Interface (GUI) on a screen 34 so a user can set options relating to an image segment that will be displayed on a corresponding display device 30. In more detail, a user sets the image segment to be displayed on the display device 30 through a remote controller or a panel key (S81). Note, this differs from FIG. 4 in which the user sets options through the image source 20.

Figure 9:
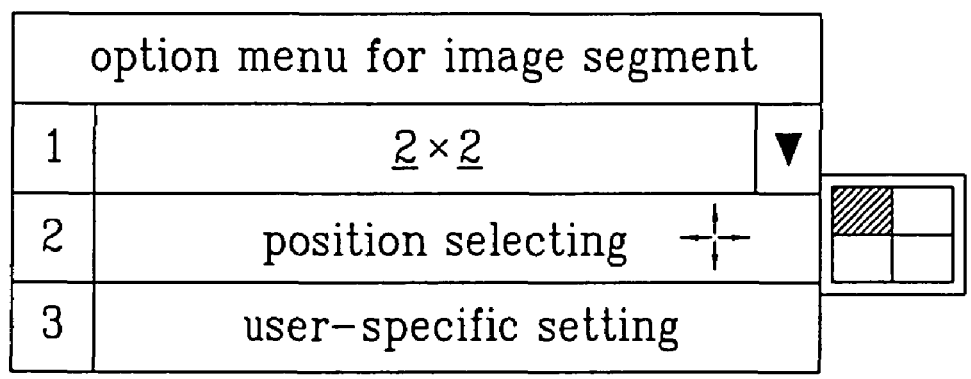
FIG. 9 is a diagram of an image segment option menu.

FIG. 9 is an example of a diagram of the OSD or GUI provided by the controller 33. As shown in FIG. 9, the user can input or select the number and/or arrangement of the display devices 30 on the OSD or GUI through the remote controller or the panel key of the display device 30. Also, the user can select or input the position of the image segment to be displayed on the display device 30. The options selected by the user are also stored in the memory 35.

After setting the corresponding image segments of all display devices 30, the driver 23 receives a video signal (e.g., an R/G/B signal) corresponding to an original image or reads a video signal stored in the memory (not shown), and transmits the video signal to the transmitter 22. The transmitter 22 then outputs the video signal and the corresponding H-SYNC and V-SYNC signals 30 (S82). At this point, as shown in FIG. 2, the transmitter 22 can transmit the video signal and the H-SYNC and V-SYNC signals to the display devices 30 at the same time, or as shown in FIG. 3, the transmitter 22 can transmit the signals through a single display device 30 and then to the other display devices in sequence.

Further, the video processors 32 of the display devices 30 receive the video signal and the H-SYNC and V-SYNC signals from the image source device 20. The controller 33 then controls the video processor 32 to process the video signal according to the image segment options stored in the memory 35. That is, the video processor 32 extracts only the corresponding image segment from the video signal based on the image segment options (S83). Then, the video processor 32 enlarges the extracted image segment and displays the enlarged image on the screen 34 (S84).

Third Embodiment

Figure 10:
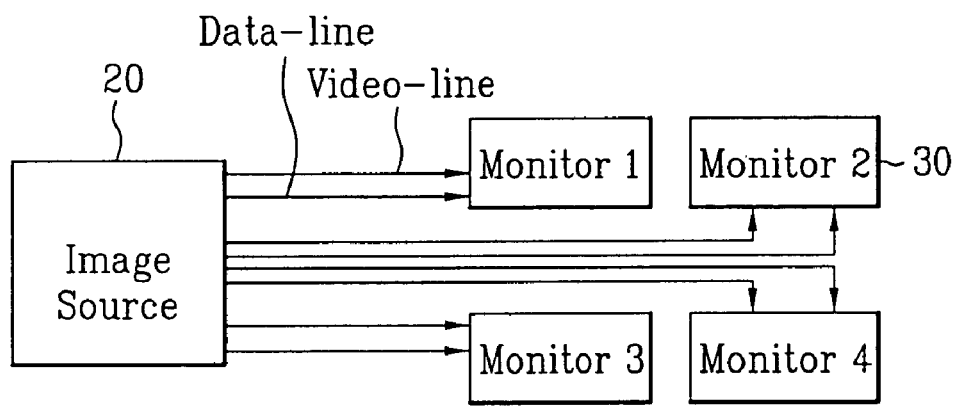
FIGS. 10 and 11 are block diagrams of a multi-screen system according to another embodiment of the present invention.
Figure 11:
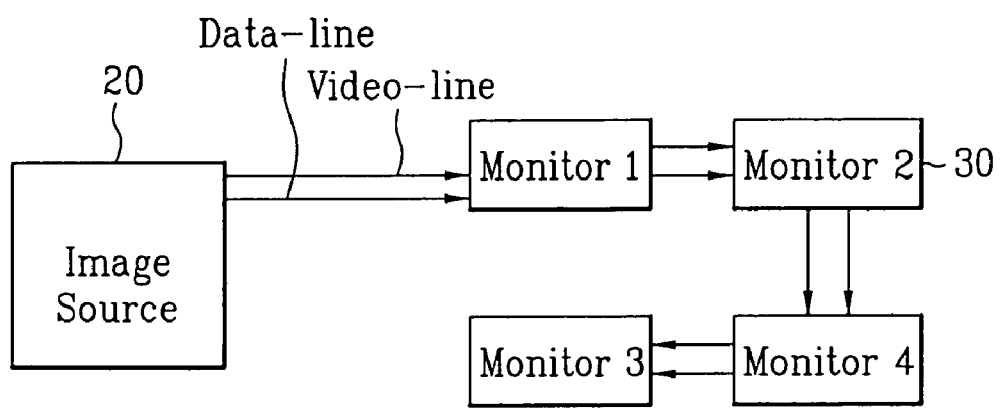
Figure 12:
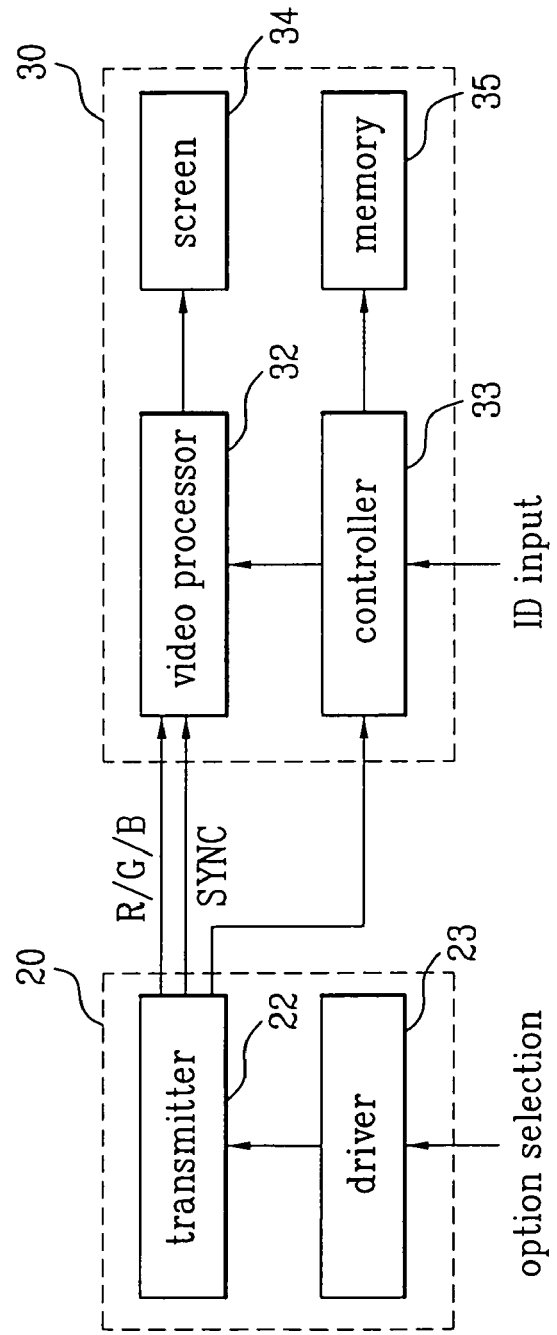
FIG. 12 is a block diagram of a multi-screen system according to a third embodiment of the present invention.
Figure 13:
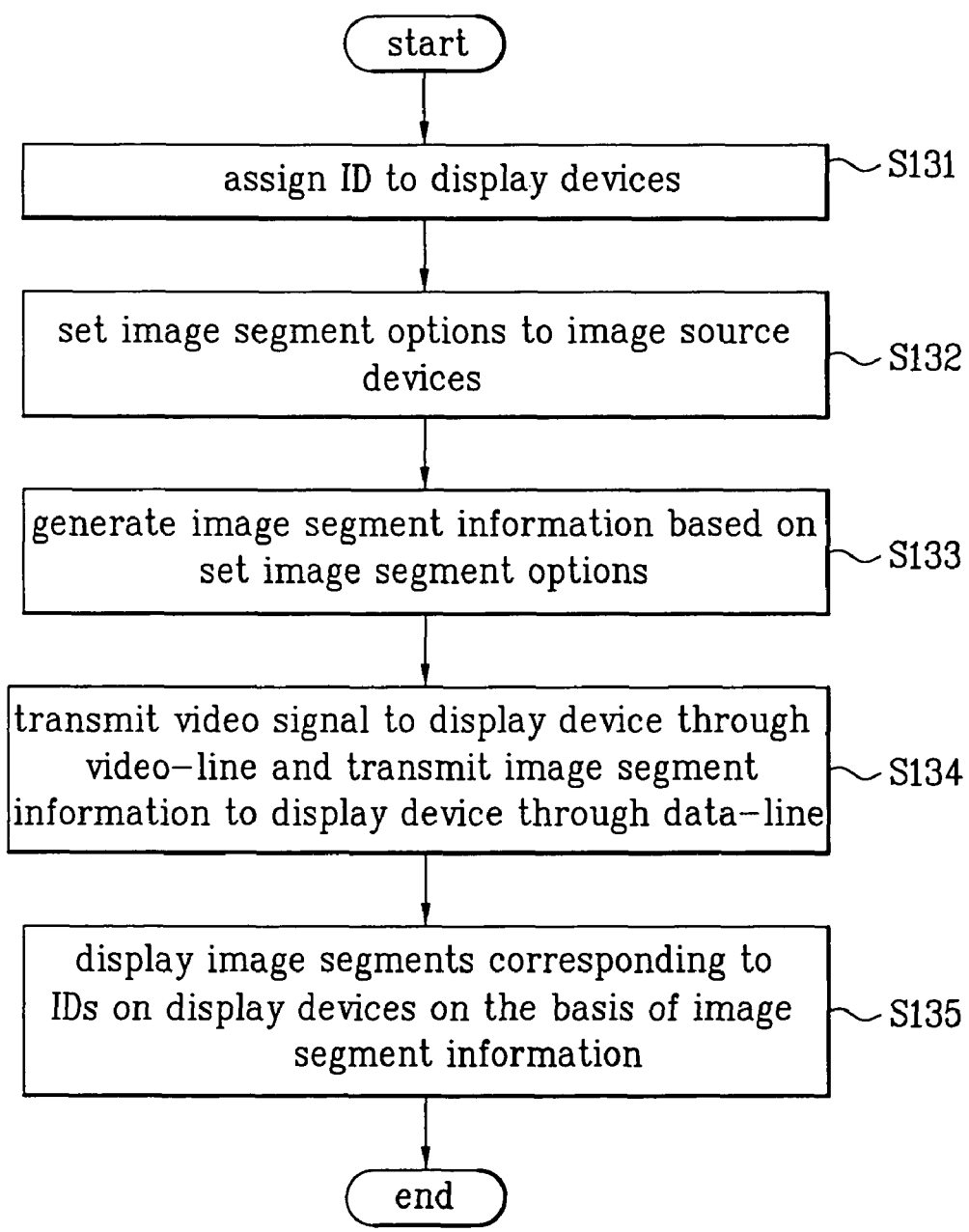
FIG. 13 is a flowchart illustrating a driving method of the multi-screen system according to the third embodiment of the present invention.

Turning next to FIGS. 10 and 11, which are block diagrams of multi-screen systems including an image source device 20 connected to a plurality of display devices 30 (e.g., monitors 1-4) through a video line and data line according to the present invention. Further, FIG. 12 is a block diagram of the image source device 20 and the display devices 30 shown in FIG. 11, and FIG. 13 is a flowchart illustrating a driving method of the multi-screen system according to a third embodiment of the present invention.

First, as discussed above, a user assigns IDs to the respective display devices 30 through a remote controller or a panel key (S131). Further, the ID inputted to the controller 33 of the display device is stored in the memory 35. Then, the user sets image segment related options to the driver 23 (S132). For example, the user inputs or selects the number of the display devices 30, the IDs assigned to the display devices 30, and positions and arrangements of the image segments corresponding to the IDs from an OSD/GUI or a selection menu, which is provided by the image source device 20.

The driver 23 then generates the image segment information based on the image segment options inputted or selected by the user (S133). Further, as discussed above, image segment information includes, e.g., a position indicator of the image segments corresponding to the IDs having a start horizontal line H_START, an end horizontal line H_END, a start vertical line V_START and an end vertical line V_END of the image segment.

If the image segment information is generated, the driver 23 receives the video signal (e.g., an R/G/B signal) corresponding to the original image or reads the video signal stored in a memory (not shown). Then, the driver 23 transmits the video signal and the image segment information to the transmitter 22. Further, the transmitter 22 transmits the video signal and the corresponding H-SYNC and V-SYNC signals to the video processor 32 of the display devices 30 through the video line, and transmits the image segment information to the controller 33 of the display device 30 through the data line (S134).

At this point, as shown in FIG. 10, the transmitter 22 can transmit the video signal and the image segment information to the display devices 30 at the same time, or as shown in FIG. 11, the transmitter 22 can transmit the video signal and the image segment information through one display device 30 and then to the other display devices in sequence. Further, each controller 33 of the display devices 30 receives the video signal from the image source device 20 and the video processor 32 receives the video signal and the H-SYNC and V-SYNC signals. The controller 33 then extracts data relating to the image segment corresponding to the assigned ID from the received image segment information.

The extracted data relating to the image segment includes the position indicator of the image segment to be displayed on the corresponding display device 30. The controller 33 controls the video processor 32 to extract only the image segment corresponding to the assigned ID from the received video signal based on the extracted data relating to the image segment. Thus, the video processor 32 extracts the image segments corresponding to the assigned ID from the original image, enlarges the extracted image segment and displays the enlarged image on the screen 34 (S135).

In addition, as shown in FIG. 10, rather than using a video line to communicate between the image source 20 and display device 30, a separate video line may be used to transmit the video and a separate bi-directional data line to transmit/receive the request/response signals. Thus, because a separate data and video line is used, the control information can be efficiently provided to the display devices via the dedicated data line and the video can be efficiently provided to the display devices via the dedicated video line. Further, if one of the video or data lines was disrupted, the other data line may be used to transmit both the video and control information.

Fourth Embodiment

Figure 14:
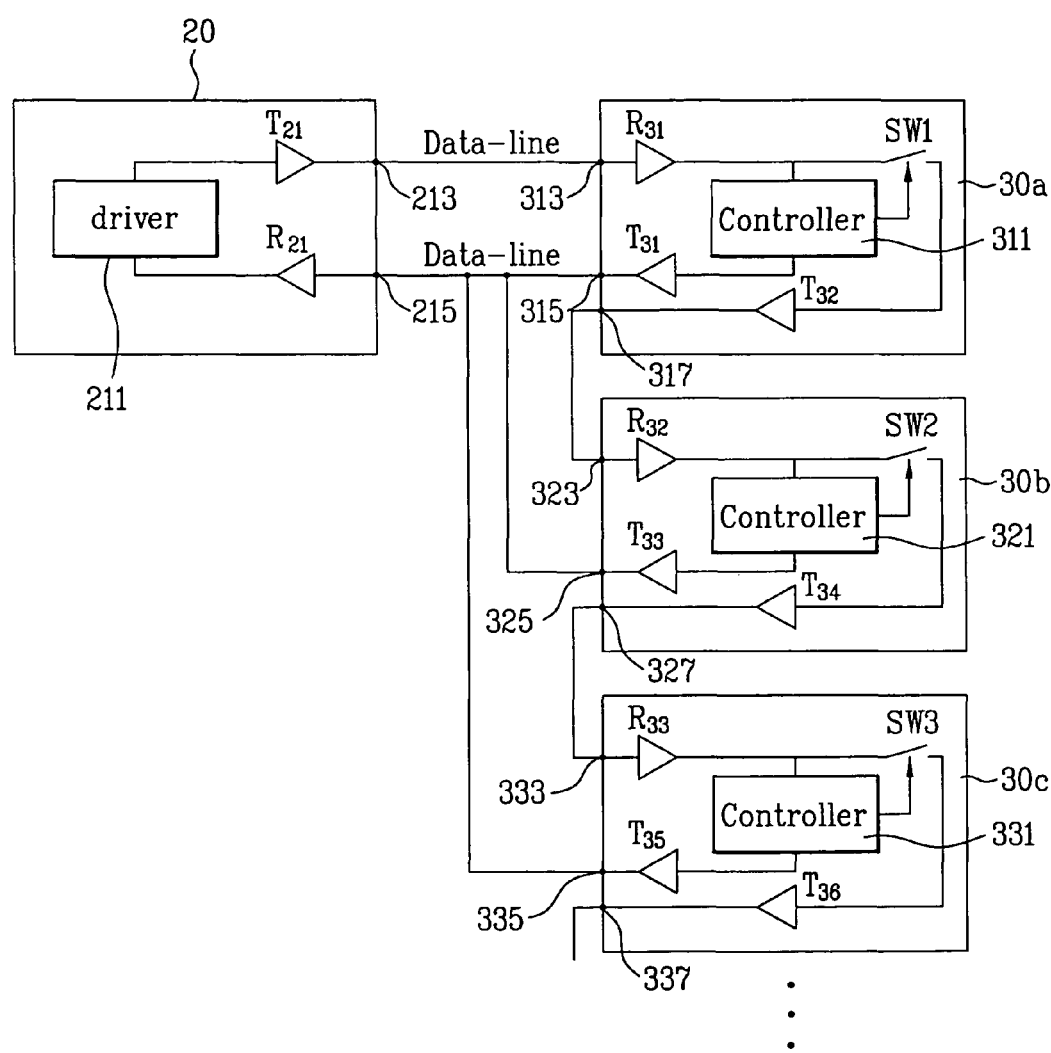
FIG. 14 is a circuit diagram of a multi-screen system according to a fourth embodiment of the present invention.

FIG. 14 illustrates a fourth embodiment of the present invention. As shown, an image source device 20 is connected to a plurality of display devices 30a, 30b, 30c . . . via a bi-directional data line. Referring to FIG. 14, the image source device 20 includes a driver (e.g., a microcomputer) 211, a transmitter T21, a receiver R21, an output port 213, and an input port 215. The driver 211 transmits request signals through the transmitter T21 to the display devices 30a to 30c in sequence and assigns IDs to the display devices 30a to 30c. The driver 211 also receives response signals from the display devices 30a to 30c through the receiver R21 and recognizes the display devices 30a to 30c based on the received response signal. As shown, the output port 213 of the image source device 20 is connected only to the input port 313 of the first display device 30a, and the input port 215 of the image source device 20 is connected to the output ports 315 to 335 of all display devices 30a to 30c.

As shown, the first display device 30a includes a controller 311, a receiver R31, transmitters T31 and T32, an input port 313, output ports 315 and 317, and a switch SW1. The display device 30a also includes a screen (not shown). The other display devices 30b and 30c have a similar structure as the first display device 30a. Further, the display devices 30a to 30c receive the request signals from the image source device 20, generate response signals in response to the request signals, and transmit the response signals to the image source device 20. If the request signals are received, the turned-off switches SW1, SW2 and SW3 are turned on in sequence.

In addition, the input and output ports of the image source device 20 and the display devices 30a to 30c are, for example, RS-232 based ports. Further, although not shown in FIG. 14, the image source device 20 and the display devices 30a to 30c include a memory. Also, the display devices 30a to 30c further include a video processor. Note, FIG. 14 illustrates only three display devices 30a to 30c, however, any number of display devices may be included.

Figure 15:
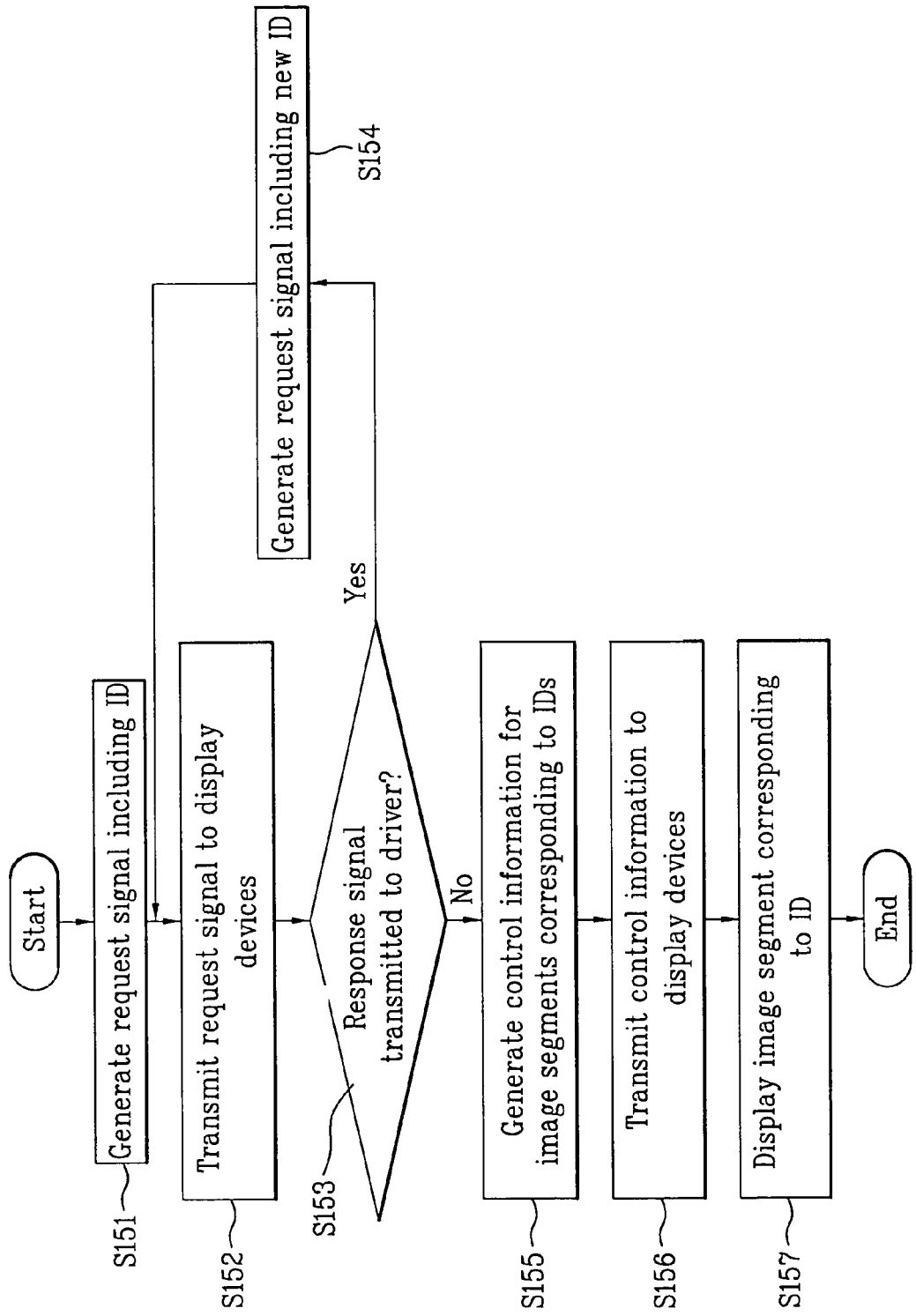
FIG. 15 is a flowchart illustrating a driving method of the multi-screen system according to the fourth embodiment of the present invention.

A driving method of the multi-screen system according to the fourth embodiment of the present invention will now be described below with reference to FIG. 15. Before the image source device 20 transmits the video data to the display devices 30a to 30c, the device 20 checks the number, connection relation and states of the display devices 30a to 30c. For this purpose, the image source device 20 generates a request signal including an ID (S151), and transmits the request signal to the first display device 30a through the transmitter T21 (S152).

The controller 311 of the first display device 30a receives the request signal through the receiver R31 and reads the first ID information contained in the request signal. The ID information includes the image segment number or symbol of the image segment to be displayed on the first display device 30a. For example, the first ID information can be simply expressed as "#1."

After the controller 311 reads the first ID information, the controller 311 stores the First ID information in a memory (not shown) and transmits a control signal to the switch SW1 so as to turn on the switch SW1. Also, the controller 311 transmits a response signal for the request signal to the image source device 20 through the transmitter T31.

The response signal includes a variety of information relating to the first display device 30a. For example, the response signal includes information about a resolution, a screen size, a brightness and a chromaticity of the first display device 30a. To obtain this display information, the controller 311 may read the information stored in the memory or directly detect the information using a test image, for example.

Further, the driver 211 of the image source device 20 receives the response signal through the receiver R21 and stores the information about the first display device 30a contained in the received response signal in the memory. Further, the image source device 20 checks whether the response signal is transmitted within a set time or not. If the driver 211 of the image source device 20 does not receive the response signal within the set time (No in S153), the driver 211 does not generate the request signal any more and proceeds to S155. Note, if a response signal is not received from a display device, the driver 211 can determine there are no more display devices connected.

If the driver 211 of the image source device 20 receives the response signal from the first display device 30a, the driver 211 generates a request signal including a second ID information and transmits it to the first display device 30a (S154, S152). Because the switch SW1 of the first display device 30a is in an on-state, the request signal inputted to the first display device 30a is transmitted to the second display device 30b through the transmitter T32.

Then, the controller 321 of the second display device 30b receives the request signal through the receiver R32 and reads the second ID information contained in the request signal. As noted above, the ID information includes the image segment number or symbol of the image segment to be displayed on the second display device 30b. For example, the second ID information can be simply expressed as "#2."

After the controller 321 reads the second ID information, the controller 321 stores the second ID information in a memory (not shown) and transmits a control signal to the switch SW2 so as to turn on the switch SW2. Also, the controller 321 transmits a response signal in response to the request signal to the image source device 20 through the transmitter T33.

As discussed above, the response signal includes a variety of information relating to the second display device 30b such as a resolution, a screen size, a brightness and a chromaticity of the second display device 30b. To obtain this information, the controller 321 may read the information stored in the memory or directly detect the information using a test image, for example.

The driver 211 of the image source device 20 receives the response signal through the receiver R21 and stores the information about the second display device 30b contained in the received response signal in the memory. If the driver 211 does not receive the response signal within the set time, the driver 211 determines only the first display device 30a is present or connected, and thus does not generate any more request signals.

If the driver 211 of the image source device 20 receives the response signal from the second display device 30b, the driver 211 generates another request signal including a third ID information and transmits the signal to the first display device 30a. Because the switches SW1 and SW2 of the first and second display devices 30a and 30b are in an on-state, the request signal is transmitted to the third display device 30c through the first and second devices 30a and 30b.

Like the first and second display devices 30a and 30b, the third display device 30c stores the third ID information and transmits a response signal in response to the request signal to the image source device 20. Then, the above-described signal transmission/reception processes are repeated. For example, if the driver 211 of the image source device 20 does not receive the response signal within a set time, the driver 211 determines that other display devices are not present or connected, and thus does not generate any more request signals.

Figure 16:
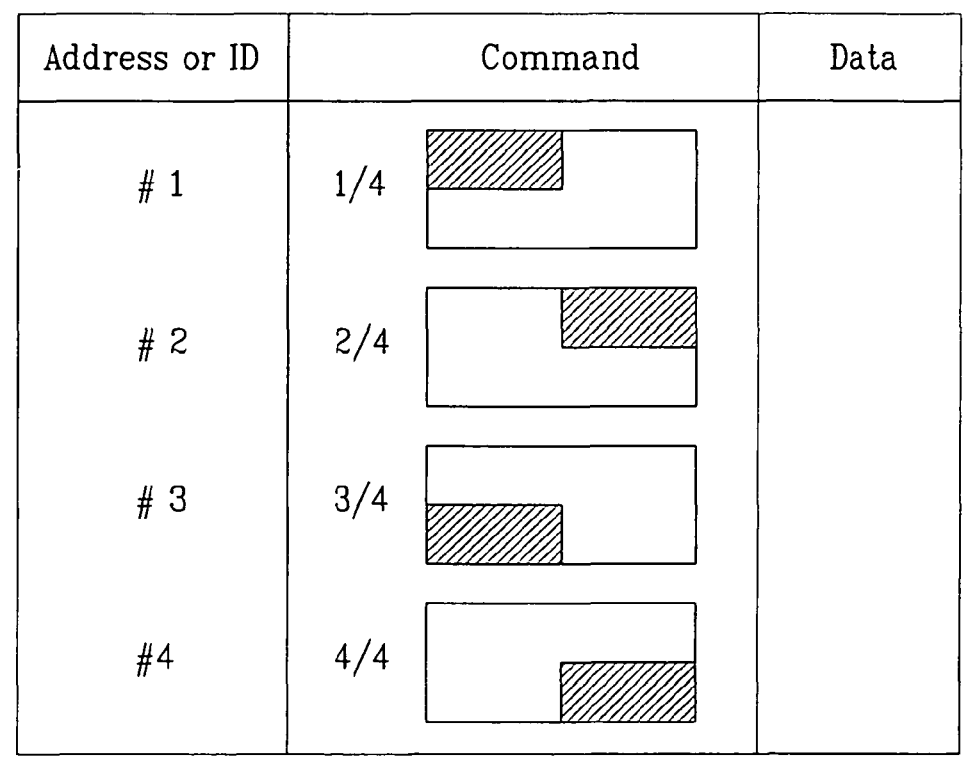

In addition, after the IDs are assigned to all of the display devices 30a to 30c, the user or the driver 211 may set the image segments to be displayed on the display devices 30a to 30c. For example, options about the partition or arrangement of the image segments are set. Further, the driver 211 generates the information relating to the image segments to be displayed based on the set options (S155). Then, the transmitter T21 outputs the image segment information to the display devices 30a to 30c (S156). FIG. 16 is an example of a diagram of the image segment to be transmitted to four display devices (S156). As shown in FIG. 16, the image segment information includes the IDs assigned to the display devices 30a to 30c and the position and arrangement of the image segments corresponding to the IDs.

Figure 17:
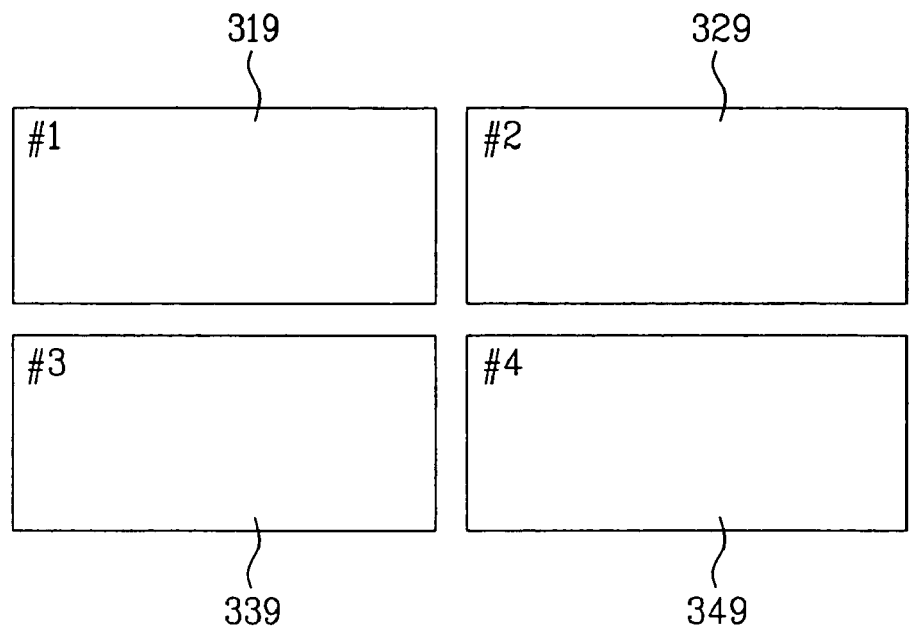
FIG. 17 is a diagram of a multi-screen according to the present invention.

The display devices 30a to 30c receive the image segment information and check the position and order of the image segments corresponding to their own ID from the received control information. Then, like the third embodiment, the display devices 30a to 30c receive the video signal corresponding to the original image through the video line and extract only the image segment corresponding to their own ID from the original image, based on the image segment information. Then, as shown in FIG. 17, the display devices 30a to 30c enlarge the corresponding image segments and display the enlarged images on the corresponding screens 319, 329, 339 and 349 (S157).

Figure 18:
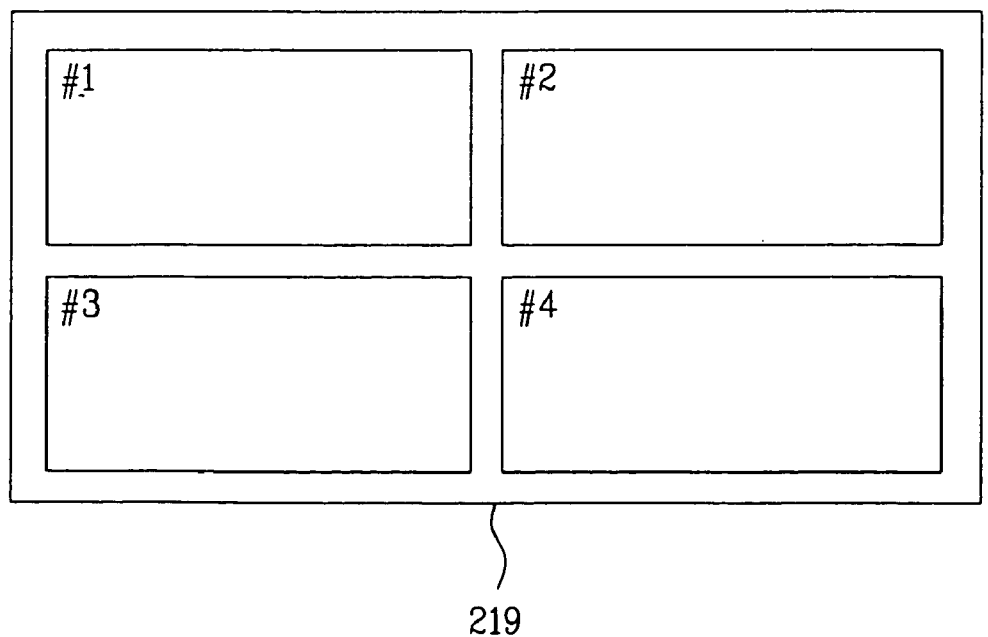
FIG. 18 is a diagram illustrating a monitor of the image source apparatus of FIG. 14.

As shown in FIG. 18, while displaying the image segments on the respective screens of the display devices 30a to 30c, the driver 211 of the image source device 20 may display the image segments in a multi-vision form on the image source device 20 or a monitor 219 of the image source device 20. The image segments displayed on the monitor may reflect the states or conditions of the display devices 30a to 30c. For example, the image segments displayed on the monitor 219 may reflect the resolution, size, brightness and chromaticity of the image segments displayed on the display devices 30a to 30c. That is, the driver 211 displays the image segments on the monitor 219 based on the information relating to the display devices 30a to 30c, which is stored in the image source device 20. Accordingly, the user can monitor the displayed image segments through the monitor 219 connected to the image source device 20.

In addition, the image source device 20 may control the resolution, screen size, brightness and chromaticity of the display devices 30a to 30c. For example, if one display device has a different brightness or chromaticity from the other display devices or if the respective display devices 30a to 30c have a different brightness or chromaticity from each other, the image source device 20 can control the display devices 30a to 30c so as to reduce the difference of the brightness or chromaticity.

As described above, because the IDs are assigned to the respective display devices, the display devices can then display only the image segments corresponding their own IDs. Accordingly, the image segments be displayed on the display devices without any distributor.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A multi-screen system comprising:
an image source device for:
providing a video signal comprised of original images,
generating control information, based on input image segment options, that comprises:
(a) position indicators that define user adjustable parameters for respective image segments of one or more of the original images, and
(b) display device ID information that associates the position indicators to respective display devices in the multi-screen system,
adding the control information to the video signal to form a combined signal, and
transmitting the combined signal; and
a plurality of display devices to receive the combined signal and detect the control information from the video signal, wherein:
the plurality of display devices correspond to said respective display devices,
each display device of the plurality of display devices is assigned a unique display device ID stored in a memory,
each display device is to extract an image segment from the video signal according to a position indicator having a corresponding display device ID detected from the control information that matches the display device ID stored in the memory, and
the extracted image segments are to be displayed on corresponding ones of the display devices according to respective ones of the position indicators.

2. The system of claim 1, wherein the image source device adds the control information to a section of the video signal corresponding to an uppermost horizontal line of the original image.

3. The system of claim 1, wherein the position indicator includes vertical and horizontal screen line position information that defines the image segment to be extracted from the original images of the video signal, and wherein the image segment is to be displayed on a screen of the display device having the corresponding display device ID.

4. The system of claim 1, wherein the image segment options include a number of the image segments and positions of the image segments relative to the original image.

5. The system of claim 1, wherein the video signal comprises an R/G/B signal.

6. A multi-screen system comprising:
an image source device for:
providing a video signal comprised of original images,
generating control information, based on input image segment options, that comprises:
(a) position indicators that define user adjustable parameters for respective image segments of one or more of the original images,
(b) display device ID information that associates the position indicators to respective display devices in the multi-screen system,
outputting the control information through a data-line, and
outputting the video signal through a video-line; and
a plurality of display devices to receiving the control information and the video signal through the data-line and the video-line, respectively, and detecting the control information, wherein:
the plurality of display devices correspond to said respective display devices,
each display device of the plurality of display devices is assigned a unique display device ID stored in a memory, each display device is to extract an image segment from the video signal according to a position indicator having a corresponding display device ID detected from the control signal that matches the display device ID stored in the memory, and the extracted image segments are displayed on respective ones of the plurality of display devices according to the respective position indicators.

7. The multi-screen system of claim 6, wherein the image segment options include a number of the image segments and positions of the image segments relative to the original images.

8. The multi-screen system of claim 6, wherein the image source device outputs the display device IDs to the display devices through the data-line.

9. The multi-screen system of claim 6, wherein the image source device outputs one display device ID to one display device through the data-line and outputs a new ID to another display device if a response signal is received from the one display device.

10. The multi-screen system of claim 6, wherein the display devices transmit information about display conditions of the display devices to the image source device.

11. The multi-screen system of claim 10, wherein the information about the display conditions includes at least one of a resolution, a screen size, a brightness or a chromaticity of the display device.

12. The multi-screen system of claim 6, wherein the image source device displays display conditions of the display devices on a screen of the image source device.

13. A driving method of a multi-screen system, comprising:

receiving an image segment option input at an image source device;

generating control information, based on the image segment option, the control information comprising (a) position indicators that define user adjustable parameters for image segments extracted from one or more original images output from the image source device that make up a video signal and (b) display device ID information that associates the position indicators to respective display devices in the multi-screen system;

adding the control information to the video signal to form a combined signal;

transmitting the combined signal from the image source device to the plurality of display devices;

detecting the control information from the video signal in each of the plurality of display devices; and extracting image segments from the video signal, wherein each display device of the plurality of display devices has a unique display device ID stored in a memory, and each display device extracts an image segment from the video signal according to a position indicator having a corresponding display device ID detected from the control signal that matches the display device ID stored in the memory; and displaying the extracted image segments on display screens of corresponding ones of the display devices according to respective ones of the position indicators.

14. The driving method of claim 13, wherein the control information is added to a section of the video signal corresponding to an uppermost horizontal line of the original images.

15. The driving method of claim 13, wherein the position indicator includes vertical and horizontal screen line position information that defines the image segment to be extracted from the original images of the video signal, and wherein the image segment is to be displayed on a screen of the display device having the corresponding display device ID.

16. The driving method of claim 13, wherein the image segment option includes a number of the image segments and positions of the image segments relative to the original images.

17. The driving method of claim 13, wherein the video signal comprises an R/G/B signal.

18. A driving method of a multi-screen system, comprising:

receiving image segment options input into an image source device;

generating control information, based on the input image segment options, comprising position indicators that define user adjustable parameters for image segments of one or more original images that make up a video signal and display device ID information that associates the position indicators to respective display devices in the multi-screen system;

transmitting the control information from the image source device to a plurality of display devices through a data-line;

transmitting the video signal from the image source device to the plurality of display devices through a video-line;

extracting image segments from the video signal, wherein each display device is assigned a unique display device ID stored in a memory, and each display device extracts an image segment from the video signal according to a position indicator having a corresponding display device ID information detected from the control signal that matches the display device ID stored in the memory; and displaying the extracted image segments on display screens of corresponding ones of the display devices according to respective ones of the position indicators.

19. The driving method of claim 18, wherein the image segment option includes a number of the image segments and positions of the image segments relative to the original images.

20. The driving method of claim 18, further comprising transmitting the display device IDs from the image source device to the display devices through the data-line.

21. The driving method of claim 20, wherein transmitting the display device IDs to the display devices includes:

outputting one display device ID to one display device of the plurality of display devices; and outputting a new display device ID to another display device if a signal responding to the outputted ID is received from the one display device.

22. The driving method of claim 18, further comprising transmitting information about display conditions of the display devices to the image source device through the data-line.

23. The driving method of claim 22, wherein the information about the display conditions includes at least one of a resolution, a screen size, a brightness or a chromaticity of the display device.

24. The driving method of claim 22, further comprising displaying the information about the display conditions of the display devices on a screen of the image source device.

25. The driving method of claim 22, further comprising displaying the image segments on a screen of the image source device according to the display conditions of the display devices.

26. A display device comprising:

a video processor configured to process a video signal, wherein the video signal comprises original images;

a memory for storing a display device ID assigned to a plurality of display devices, and a controller configured to parse the video signal for input parameter information, and to control the video processor to extract only a portion of the video signal based on the parsed input parameter information included in the video signal, wherein the input parameter information is defined according to one or more image segment options input at an image source device that is coupled to the display device, wherein the input parameter information comprises a position indicator that defines a portion of the video signal to be extracted by the video processor by identifying image segments according to vertical and horizontal positions of one or more of the original images, wherein the input parameter information further comprises display device ID information that identifies the display device for extracting the corresponding portion of the video signal to be displayed on the display device by matching with the display device ID stored in the memory.

27. The display device of claim 26, wherein the input parameters comprises an Identification (ID) of the display device.

28. The display device of claim 27, wherein the ID of the display device stored in the memory is input via a remote control or panel key of the display device.

29. The display device of claim 26, wherein only the extracted portion of the video signal is displayed on the display device.

30. The display device of claim 26, further comprising:
a video port configured to receive the video signal; and
a data port configured to receive the input parameter information about the portion of the video signal to be extracted.

31. The display device of claim 26, further comprising:
a serial port configured to be serially connected to another display device.

32. The system of claim 1, wherein each of the display devices receives the control information added to the video signal from one signal line that is coupled to the image source device without passing through another one of the display devices.

33. The system of claim 1, wherein each of the display devices receives the control information added to the video signal from one signal line that is coupled to the image source device through one or more other display devices.

34. A display device comprising:
a video processor configured to process a video signal and to process a control information signal, wherein the video signal comprises original images;
a memory for storing a display device ID of the display device, and
a controller configured to parse the control information signal and control the video processor to extract only a portion of the video signal based on input parameter information parsed from the control information signal related to the display device, wherein the input parameter information includes one or more image segment options input to an image source device,
wherein the input parameter information further comprises a display device ID that indentifies the display device for the portion of the video signal by matching with the display device ID stored in the memory and a position indicator that defines the portion to be extracted by the controller by indentifying an image segment according to vertical and horizontal positions of one or more of the original images; and
a serial port configured to be serially coupled to another display device.

35. The display system of claim 34, further comprising:
a video port configured to receive the video signal; and
a data port configured to receive the input parameter information about the portion of the video signal to be extracted.

36. The system of claim 1, wherein each of the display devices receives the control information added to the video signal from one signal line that is coupled to the image source device without passing through another one of the display devices.

37. The system of claim 1, wherein each of the display devices receives the control information added to the video signal from one signal line that is coupled to the image source device through one or more other display devices.

38. The driving method of claim 13, wherein each of the display devices receives the control information added to the video signal from one signal line that is coupled to the image source device without passing through another one of the display devices.

39. The driving method of claim 13, wherein each of the display devices receives the control information added to the video signal from one signal line that is coupled to the image source device through one or more other display devices.

* * * * *